US010469200B2

(12) United States Patent
Mantiply et al.

(10) Patent No.: US 10,469,200 B2
(45) Date of Patent: Nov. 5, 2019

(54) MINIMUM LATENCY LINK LAYER METAFRAMING AND ERROR CORRECTION

(71) Applicant: Cisco Technology, Inc., San Jose, CA (US)

(72) Inventors: Paul Lachlan Mantiply, Mountain View, CA (US); Peter Malcolm Barnes, Mountain View, CA (US); Oded Trainin, Ra'ananna (IL); John Joseph Williams, Jr., Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/888,905

(22) Filed: Feb. 5, 2018

(65) Prior Publication Data

US 2018/0159659 A1    Jun. 7, 2018

Related U.S. Application Data

(63) Continuation of application No. 14/796,792, filed on Jul. 10, 2015, now Pat. No. 9,887,806.

(51) Int. Cl.
*H04L 1/00* (2006.01)
*H04L 1/08* (2006.01)

(52) U.S. Cl.
CPC .......... *H04L 1/0057* (2013.01); *H04L 1/0007* (2013.01); *H04L 1/0009* (2013.01);
(Continued)

(58) Field of Classification Search
None
See application file for complete search history.

(56) References Cited

U.S. PATENT DOCUMENTS 5,719,883 A * 2/1998 Ayanoglu ............... H04L 1/0001
                                                  370/216
6,490,260 B1 * 12/2002 Hwang ................ H04B 7/2659
                                                  370/335
(Continued)

FOREIGN PATENT DOCUMENTS

WO     2006078418 A2     7/2006

OTHER PUBLICATIONS

International Search Report and Written Opinion for International Application No. PCT/US2016/041800, dated Dec. 13, 2016.
(Continued)

*Primary Examiner* — Daniel F. McMahon
(74) *Attorney, Agent, or Firm* — Patterson + Sheridan, LLP

(57) ABSTRACT

Techniques for reducing latency associated with metaframe error correction. Embodiments receive, via a first port of a plurality of ports, a stream of bits within a metaframe. Upon evaluating a first cyclic redundancy check (CRC) for a first portion of the stream of bits and determining that the first CRC is valid, a measure of latency incurred in transmitting the first portion is reduced, relative to first performing forward error correction (FEC) decoding for the first portion prior to transmission, by transmitting the first portion of the stream of bits without performing FEC decoding for the first portion of the stream of bits. Upon evaluating a second CRC for a second portion of the stream of bits and determining that the second CRC is invalid, FEC decoding is performed for the second portion of the stream of bits before forwarding the second portion of the stream of bits.

14 Claims, 10 Drawing Sheets

(52) U.S. Cl.
CPC .......... *H04L 1/0053* (2013.01); *H04L 1/0061* (2013.01); *H04L 1/08* (2013.01)

(56) References Cited

U.S. PATENT DOCUMENTS

| | | | |
|---|---|---|---|
| 6,567,390 B1 | 5/2003 | Banister et al. | |
| 6,771,660 B1* | 8/2004 | Bourlas | H04L 29/06 370/350 |
| 8,347,199 B2* | 1/2013 | Lawson | H04L 1/0061 714/807 |
| 8,732,558 B1* | 5/2014 | Park | H03M 13/3707 714/774 |
| 2005/0108597 A1 | 5/2005 | Iwami et al. | |
| 2006/0146814 A1* | 7/2006 | Shah | H04L 67/1097 370/389 |
| 2006/0268726 A1* | 11/2006 | Alamaunu | H03M 13/154 370/242 |
| 2007/0130495 A1* | 6/2007 | Yoon | H04L 1/0046 714/758 |
| 2009/0049362 A1* | 2/2009 | Mudulodu | H03M 13/3715 714/755 |
| 2010/0205518 A1* | 8/2010 | Golitschek Edler von Elbwart | H03M 13/09 714/807 |
| 2011/0078539 A1* | 3/2011 | Kim | H04N 19/70 714/758 |
| 2011/0197106 A1* | 8/2011 | Kishigami | H03M 13/09 714/755 |
| 2012/0066562 A1* | 3/2012 | Riess | H03M 13/6306 714/751 |
| 2012/0144265 A1* | 6/2012 | Hwang | H04L 1/0082 714/758 |
| 2014/0010175 A1* | 1/2014 | Chiu | H04W 72/042 370/329 |
| 2015/0016426 A1* | 1/2015 | Merlin | H04W 72/0466 370/335 |
| 2015/0244500 A1* | 8/2015 | Muller | H04L 1/0054 375/222 |
| 2016/0277145 A1* | 9/2016 | Grant | H04L 1/0041 |

OTHER PUBLICATIONS

European Examination Report for Application No. 16 744 612.9-1220 dated Jan. 7, 2019.

* cited by examiner

MINIMUM LATENCY LINK LAYER METAFRAMING AND ERROR CORRECTION

CROSS-REFERENCE TO RELATED APPLICATIONS

This application is a continuation of co-pending U.S. patent application Ser. No. 14/796,792, filed Jul. 10, 2015. The aforementioned related patent application is herein incorporated by reference in its entirety.

TECHNICAL FIELD

Embodiments presented in this disclosure generally relate to computer networks, and more specifically, embodiments disclosed herein relate to techniques and apparatus for improved error correction techniques that reduce latency and power consumption for a communications link.

BACKGROUND

A computer network, in general, allows two or more devices interconnected by communication links and subnetworks to exchange information and/or share resources. The devices may serve as endpoint devices where data is typically originated or terminated in the computer network, or serve as intermediate devices where data is typically routed to other devices (e.g., other intermediate devices, endpoint devices, etc.) and/or subnetworks in the computer network. Examples of intermediate devices include routers, bridges and switches that interconnect communication links and subnetworks, whereas an endpoint device may be a computer located on one of the subnetworks.

Devices in the computer network (e.g., endpoint devices, intermediate devices, etc.), in general, communicate by exchanging discrete packets or frames of data, according to predefined protocols. In this context, a protocol represents a set of rules defining how the stations interact with each other to transfer data. The traffic flowing into a network device— e.g., a router, switch, bridge, server, and the like—is generally made up of multiple abstraction layers (e.g., the Open Systems Interconnection (OSI) model). A frame, for example, is a logical grouping of information sent as a data link layer over a transmission medium. Frames typically include header and/or trailer information used for routing, synchronization, and error control. The header and/or trailer information surrounds user data contained in the unit. The terms datagram, packet, and segment are also used to describe logical information groupings at various layers of the OSI reference model and in various technology circles.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1A:
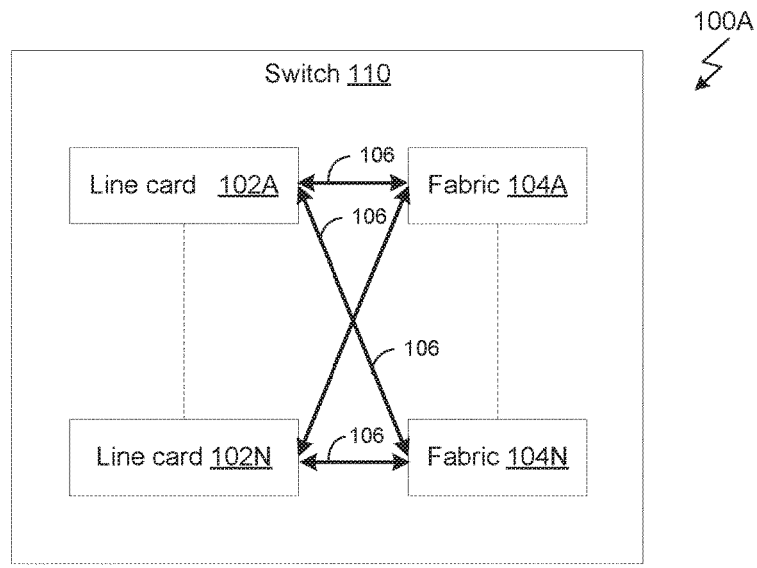
FIGS. 1A-1C illustrate different system topologies of network switches in which techniques presented herein may be practiced, in accordance with embodiments of the present disclosure.

Embodiments presented in this disclosure provide a method, network device and non-transitory computer-readable medium for reducing latency associated with metaframe error correction. The method, network device and non-transitory computer-readable medium include receiving, via a first port of a plurality of ports, a stream of bits within a metaframe. The method, network device and non-transitory computer-readable medium include, upon evaluating a first cyclic redundancy check (CRC) for a first portion of the stream of bits and determining that the first CRC is valid, reducing a measure of latency incurred in transmitting the first portion, relative to first performing forward error correction (FEC) decoding for the first portion prior to transmission, by transmitting the first portion of the stream of bits without performing FEC decoding for the first portion of the stream of bits. Additionally, the method, network device and non-transitory computer-readable medium include, upon evaluating a second CRC for a second portion of the stream of bits and determining that the second CRC is invalid, performing FEC decoding for the second portion of the stream of bits before forwarding the second portion of the stream of bits.

Example Embodiments

Data that is exchanged between network devices in a communications network typically passes over several data links. These data links could be between the various network devices or between certain components (e.g., line cards, fabrics, chips, etc.) within the network devices. The data that is passed over the links in a communications network typically requires a validation check at the receive end in order to ensure no errors are propagated into the end device. Further, in the event one or more errors are detected within a communication on a link, a mechanism to correct the errors is required.

In a communications network, the data link layer is the layer that typically handles flow control, error notification and error correction. The data link layer generally provides error-free transfer of data frames over the physical layer, allowing layers above it to assume virtually error-free transmission over the link. Error detection is typically accomplished by framing the data that transmitted over a link and applying a cyclic redundancy check (CRC) to the framed data. Once an error is detected, correcting the error is typically accomplished via the use of error correction codes (e.g., forward error correction (FEC) codes, etc.) and/or a re-transmission mechanism.

Receivers that employ conventional error detection and/or error correction mechanisms to data received over a link incur a significant amount of latency and typically utilize a significant amount of power when processing the received data. The latency that is incurred is due, in part, to receivers waiting for a full frame to be received before processing (e.g., performing error detection and/or error correction to) the received frame. Traditional techniques that attempt to reduce this latency typically do so by reducing the size of a frame (e.g., the number of bits in a frame) in order to reduce the amount of time a receiver has to store the frame and performing processing on the frame.

However, while these techniques may be satisfactory in cases where small data frames are transmitted on a link, these techniques add significant overhead to the link, especially in the case where large amounts of information is transmitted in a network. For example, although reducing the size of the data may reduce the number of bits included in the data frame, the size of the forward error correction (FEC) protection cannot be reduced proportionally. In other words, with these techniques, the protection symbols that are associated with error correction (e.g., FEC, etc.) take up a greater proportion of the bandwidth, since the amount of protection symbols for a frame are generally kept constant even though the amount of data symbols in the frame have been reduced. Accordingly, when implementing these techniques, there is typically a tradeoff between achieving low latency and increasing overhead on the link.

Further, other traditional techniques, such as hybrid automatic repeat request (HARQ) II that attempt to reduce latency and/or overhead are not capable of doing so without sacrificing protection strength. For example, these techniques typically add FEC protection only during a re-transmit mechanism. However, the re-transmit mechanism is less efficient in the presence of errors and, in general, induces jitter due, in part, to the additional latency of a round trip required by the re-transmit mechanism. Additionally, in poor quality transmission environments, the re-transmit request has the potential to be corrupted, resulting in significant implementation complexity. Also, frame latency is typically not addressed with these traditional techniques.

As such, embodiments presented herein provide techniques, apparatus and systems for data framing, error detection and error correction that provide for minimum (low) latency and/or low power for a communication link. As will described in more detail below, the techniques disclosed herein are capable of being utilized for internal communication links between two or more components within a network device (e.g., such as a Serializer/Deserializer (SerDes) channel within a router or switch) and/or are capable of being utilized for communication links between two or more network devices. The techniques presented herein are capable of reducing and/or eliminating the average frame accumulation latency, FEC engine latency, and/or FEC engine power dissipation without requiring a re-transmit mechanism (e.g., as in HARQ II). However, as will be described below, certain embodiments presented herein implement a re-transmit mechanism in addition to the other various techniques (e.g., data-cut through, on-demand FEC, etc.). As such, the embodiments disclosed herein provide greater flexibly over traditional methods.

One embodiment includes a network device that receives, via first port of a plurality of ports, a stream of bits within a metaframe and stores a first portion of the stream of bits in a metaframe buffer. The network device then determines whether to forward the first portion of the stream of bits in the metaframe buffer with or without performing FEC decoding, based on an evaluation of a CRC for the first portion of the stream of bits. For example, upon determining that the CRC for the first portion is valid, the network device may not perform FEC decoding for the first portion of the stream of bits. On the other hand, upon determining that the CRC for the first portion is invalid, the network device could perform FEC decoding for the first portion of the stream of bits. Doing so in this manner provides flexible framing, a data-cut through mechanism and on-demand FEC (e.g., performing FEC decoding only when there is an error and deactivating FEC decoding when there is no error) which reduces latency without comprising maximum throughput or protection strength.

It should be noted that although many of the following embodiments are described with reference to a particular type of network device, e.g., switches, routers, etc., those of ordinary skill in the art will understand that the techniques described herein could also be applied to other types of network devices capable of communicating on a link that is subject to bit errors and requires any of framing, error detection and error decoding. Further, for clarity, certain aspects of the techniques are described herein for meta-frames and terminology regarding metaframes is used in much of the description herein. However, it should be noted that the techniques described herein, in general, can be used for any type of logical grouping used at the data link layer.

FIG. 1A is a block diagram illustrating an architecture 100A of a switch, in which aspects of the present disclosure may be practiced. For example, as will be described in more detail below, the line cards 102A-N and fabric cards 104A-N are capable of communicating on SerDes links (e.g., local links 106) within the switch 110 utilizing checkpoints, data-cut through and/or on-demand FEC, thereby achieving communications with low latency and/or low power. In this embodiment, the switch 110 is implemented as a single stage switch as a part of a single chassis system.

Figure 1B:
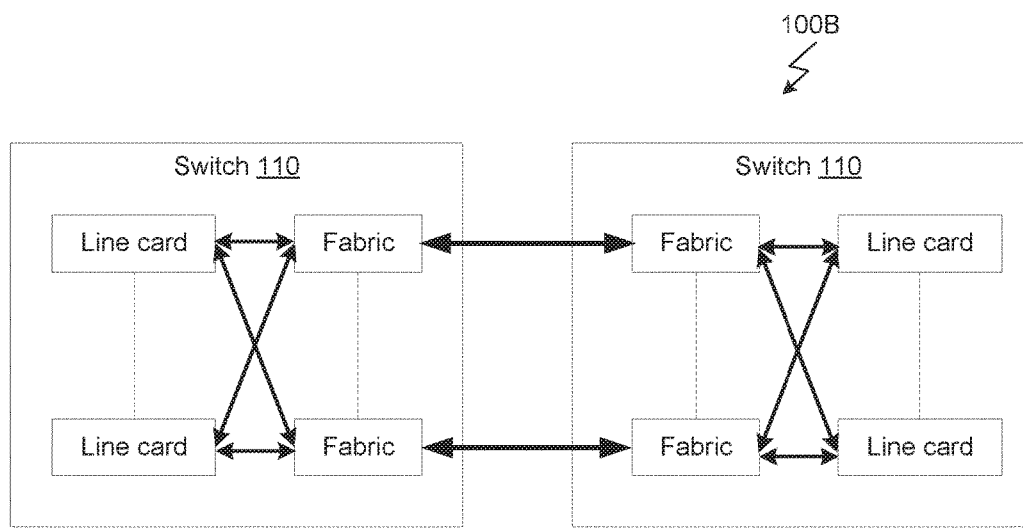
Figure 1C:
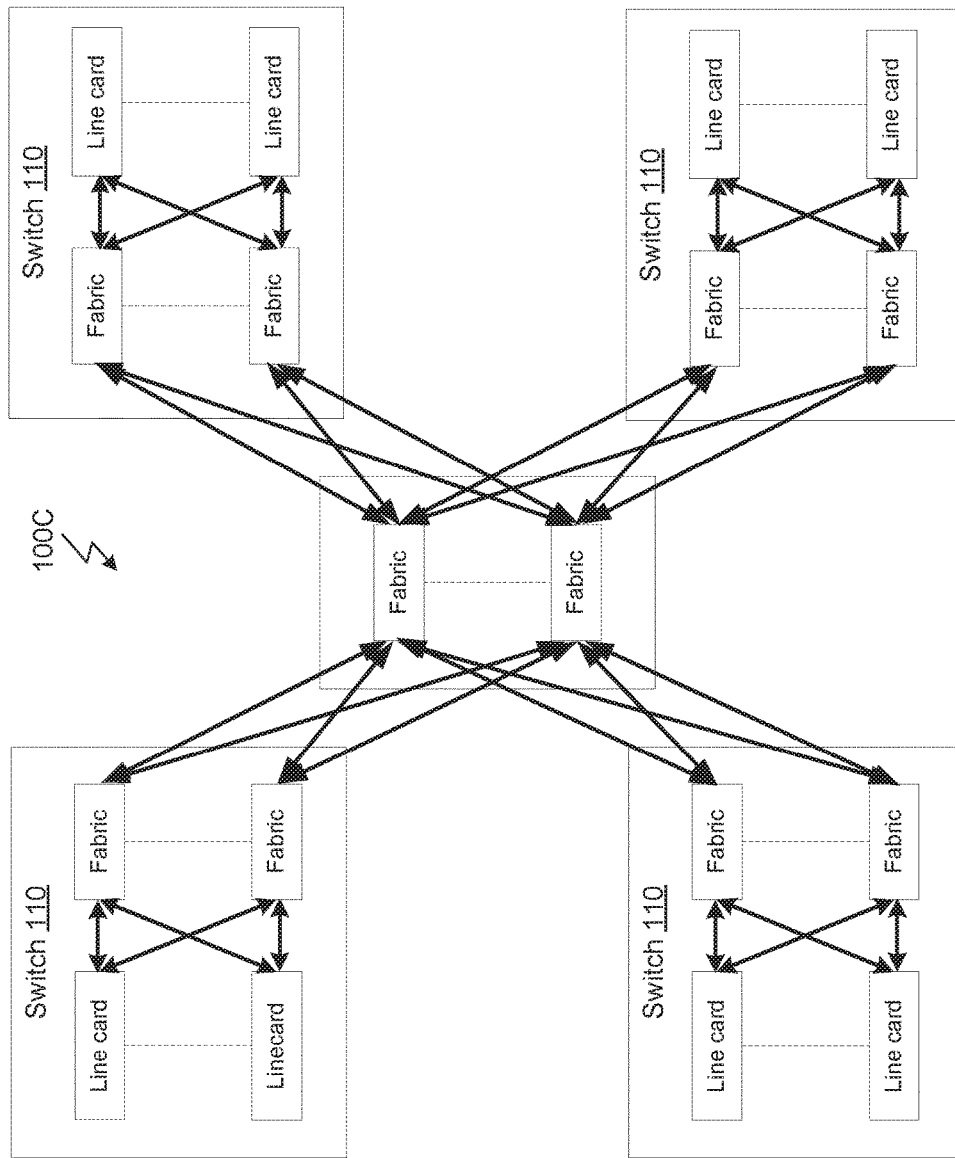

As shown, the switch 110 generally includes a plurality of line cards 102A-N and fabrics cards 104A-N that are connected through the backplane via a plurality of local links 106. Such a switch 110 could be used, for instance, as part of a switching network (e.g., as shown in FIGS. 1B-1C) to connect various network devices (not shown) to one another via connections between the network devices and the line cards using the local links 106. For example, the switch 110 could implement switching for frames between the ports on the different line cards.

Generally, such a switching network can employ a variety of different communication protocols enabling data communication between the network devices. Although not shown, each of the line cards 102A-N generally includes a line I/O interface that typically performs data analysis as part of the switching process. The line interfaces are connected to the fabric devices across the backplane using serial links (e.g., local links 106). Further, each fabric device 104A-N may be a part of a single switching fabric that is used to connect the line cards (e.g., line card 102A to line card 102N).

The switching fabric connecting the line cards can be implemented in a variety of ways. Three common types of switching fabrics are single-bus architectures, shared-memory architectures, and cross-bars. Single-bus switching fabric architectures generally use a central fabric element within the switch to which all the ports of the switch communicate, where each port arbitrates for access to this fabric since there is one central switching element.

With shared-memory architectures, a shared memory can be used to store data frames and a high-speed ASIC can be configured to read and write to the memory. In such an architecture, when frames enter one of the inbound ports of the switching fabric, a switching core can place the frames in the memory and can then queue the frames to their outbound port. Buffering in such an architecture can be internal to the switching fabric and the buffers may be, e.g., fixed or dynamic buffers.

Crossbars (XBARs) use a mesh within the switching fabric to connect all the ports or all the line cards at high speed. One of the key benefits of crossbars is the ability to scale to significantly high bandwidth and throughputs, thus making crossbars a popular type of switching fabric. For instance, a crossbar switching fabric can include one or more input buffers and one or more output buffers. In some implementations, there may be input and output buffers for each port in the switching fabric. Consequently, input and output buffers can be associated with particular line cards by virtue of the buffers' association with a particular port. Data frames to be transferred from one line card to another can first be queued in the queue corresponding to the first line card. Such a queue can be implemented as a first in first out (FIFO) buffer using a variety of memory structures. Once a data frame is ready for transmission, the data frame can be serialized and transmitted across a serial channel where it is received by an input buffer of the switching fabric. The data frame can then be transmitted across the crossbar to the output buffer corresponding to the appropriate port of exit from the switching fabric. From the output buffer, the data frame can then be serialized and transmitted to the line card corresponding to output buffer port. The data is typically received at the line card in another queue data structure.

In this embodiment, the components within switch 110 contain logic (e.g., a software application, device firmware, an ASIC, etc.) that is configured to implement one or more of the techniques presented herein. For example, as will be described below, the logic within the components (e.g., line cards, fabric cards, etc.) may be configured to implement operations 400, 500, 600 and 700 shown in FIGS. 4-7, respectively.

The techniques presented herein are also applicable to other system architectures. For example, in one embodiment, the techniques presented herein could be implemented in a back-to-back system of switches, such as system 100B shown in FIG. 1B. In another embodiment, the techniques presented herein could be implemented in a multi-chassis system, such as system 100C shown in FIG. 1C. In general, however, the techniques presented herein could be used in any system in which devices communicate on a link or in which components of a device communicate on a link. These devices could include chips, disks, CPUs, computer servers, etc. Although not described, it should be noted that the components shown in FIGS. 1B and 1C are substantially similar to those in FIG. 1A and are systems that are well known to those of ordinary skill in the art.

In one embodiment, each link 106 represents a pair of logical lanes operating together in opposite directions over physical SerDes. In such an embodiment, on each logical lane, data is sent in the forward direction and handshake messages are sent in the opposite direction. More generally, however, the techniques described herein can be applied to any link between components in a network, consistent with the functionality described herein. Additionally, the links may operate over various physical layers, including but not limited to copper, fiber, waveguide, etc. Further, the links may operate over a range of distances and accommodate a wide range of speeds and bit error rates.

As mentioned above, data transmitted over a link may be formatted and/or processed utilizing the techniques presented herein to minimize (reduce) the latency and/or minimize power consumption associated with processing (by receivers) of the data. For example, as will be described in more detail below, a transmitting network device may insert one or more checkpoints into a frame (e.g., such as a metaframe) in order to divide the metaframe into multiple segments, with each segment containing a portion of the data included within the metaframe. Upon receiving data included within the metaframe, the receiving network device may detect the checkpoints and process the segment of data protected by the checkpoint, as opposed to waiting for the entire metaframe to be received before processing the data. By doing so, embodiments enable network devices to significantly minimize latency and/or power consumption as compared to the amount of latency incurred and amount of power consumed in traditional methods.

Figure 2:
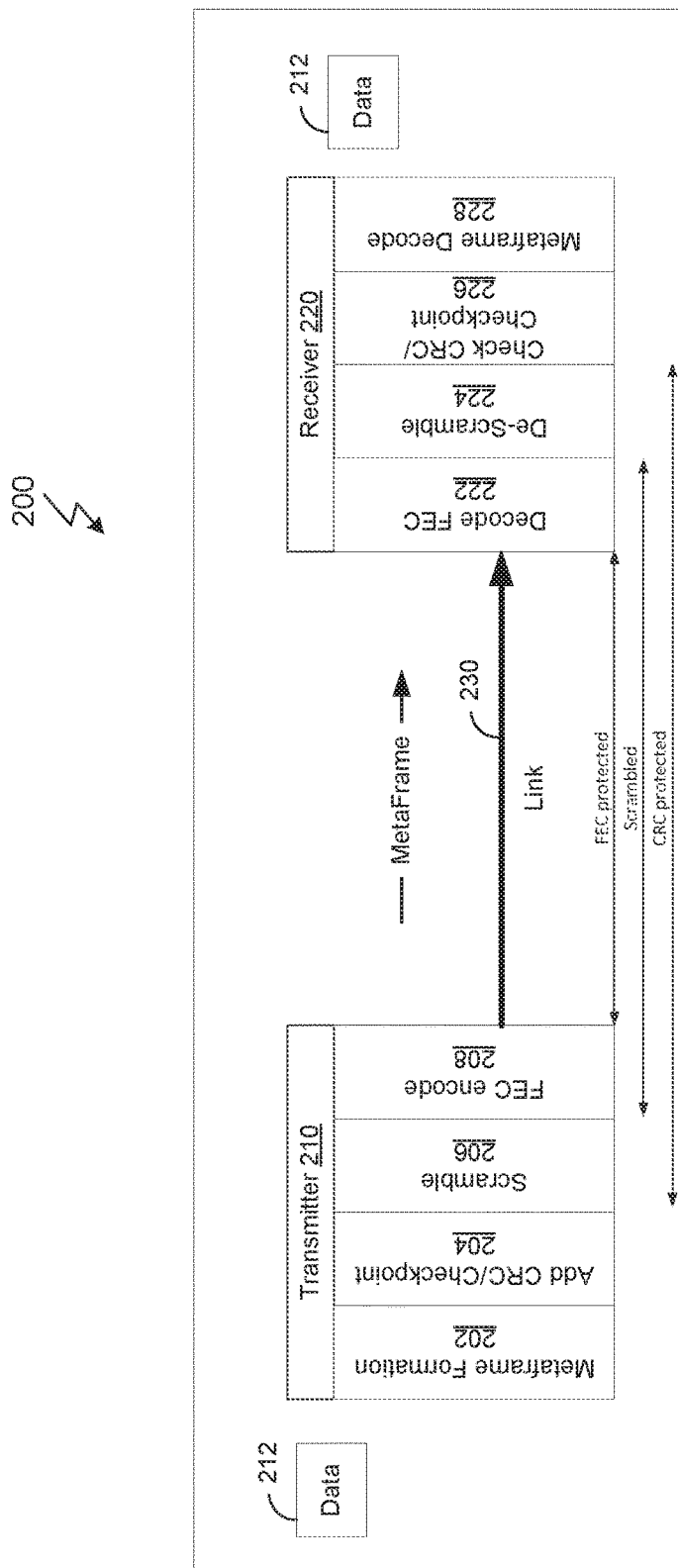
FIG. 2 illustrates a block diagram of a system with network switches configured to communicate on a link, in accordance with embodiments of the present disclosure.

FIG. 2 is a block diagram of a system 200 with network devices configured to communicate on a link utilizing the techniques presented herein. As shown, the system 200 includes a transmitter 210 and a receiver 220. In one embodiment, the transmitter 210 and the receiver 220 are network devices (e.g., such as switch, router, etc.) that communicate over a link 230. In another embodiment, the transmitter 210 and the receiver 220 are components (e.g., such as chips, line cards, etc.) that communicate over a link within a network device. The link 230 could be a serial link, such as a SerDes link, or could be any communication link that employs error correction schemes to account for data errors on the link.

Figure 3:
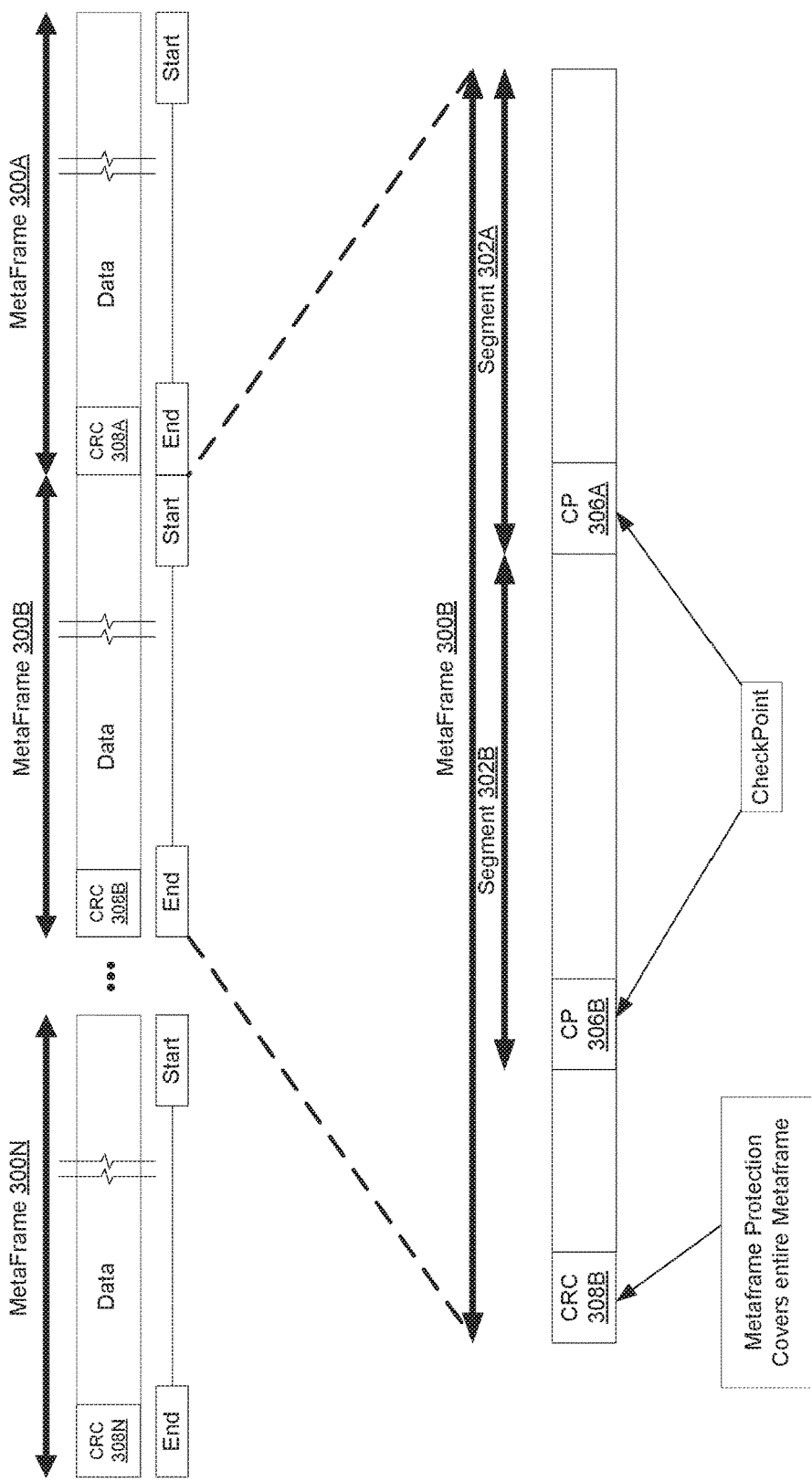
FIG. 3 illustrates a structure of a metaframe with one or more checkpoints, in accordance with embodiments of the present disclosure.

The transmitter 210 and the receiver 220 contain logic (e.g., a software application, device firmware, an ASIC, etc.) configured to implement one or more of the techniques presented herein. For example, the transmitter 210 is generally configured to perform a number of operations to protect data that is transmitted over the link 230. As shown, at block 202, the transmitter 210 is configured to format data 212 (e.g., a stream of bits) into a fixed size block of data, such as a metaframe (e.g., metaframe 300 shown in FIG. 3). At block 204, the transmitter 210 inserts a CRC into the metaframe to serve as a checkpoint mechanism for use in validating the metaframe (or portions of the metaframe). FIG. 3 shows a sequence of metaframes that could be generated by the transmitter 210, according to an embodiment of the present disclosure. As shown, each metaframe 300A-N includes payload data and a CRC 308A-N, which is used as a form of protection mechanism to protect the data of the entire metaframe. For example, the CRC 308A-N may be used (e.g., decoded) by a receiver (such as receiver 220) to validate the data contained in a received metaframe.

The metaframe 300A-N could include one or more checkpoints (CPs) 306A-N. When inserted, the CPs 306A-N divide the metaframe 300A-N into one more segments 302A-N, where each segment 302A-N contains a portion of data of the metaframe 300A-N. According to an embodiment, each CP 306A-N contains (not shown) an opcode identifying it as a CP and a CRC (e.g., 32 bit CRC) protecting the data in the segment from the previous CP or end of metaframe CRC. For example, in this embodiment, the metaframe 300B includes two CPs 306A-B that divide the metaframe 300B into two segments, segment 302A and segment 302B. In some embodiments, the CPs 306A-N could be inserted into the metaframe in a manner such that the metaframe is divided into a plurality of even segments. In other embodiments, the CPs 306A-N could be inserted into the metaframe in a manner such that the metaframe is divided into one or more uneven segments. In yet other embodiments, the CPs 306A-N could be inserted into the metaframe in a manner such that a portion of the segments are even and another portion of the segments are uneven.

According to techniques presented herein, the transmitter 210 can insert CPs 306A-N into the metaframe upon determining that the link 230 has unused bandwidth. For example, the transmitter 210 could determine that a current measure of network throughput on the link 230 is less than a threshold amount of network throughput and, in response, could insert a CP 306A-N into the current metaframe. Doing so enables the receiver 220 to take advantage of the CPs 306A-N when sufficient unused bandwidth is available and without adding any substantial amount of latency to the link 230 (i.e., as only unused bandwidth is used to transmit the CPs 306A-N).

Referring back to FIG. 2, after forming a metaframe (at 202) and adding a CRC and/or one or more CPs 306A-N (at 204), the transmitter 210 is configured to perform scrambling (at 206) and FEC encoding (at 208) before transmitting the metaframe to the receiver 220. Scrambling of the bit stream within a metaframe is typically performed with a scrambling sequence and could use, for example, any of the polynomial sequences defined in IEEE 802.3ae. After scrambling, the scrambled bit stream is protected by a FEC code generated, for example, with a polynomial defined in IEEE P802.3bj. Such a polynomial could be a Reed-Solomon code, which are commonly used to correct errors in many communication systems. According to certain embodiments, to reduce the latency incurred with the presence of FEC code within the metaframe, the protection symbols could be sent after the data symbols in the metaframe, as opposed to as before the data symbols as in traditional implementations.

Upon receiving data within a metaframe, the receiver 220 is configured to decode (at 222) the FEC code, de-scramble (at 224) the scrambled bit stream, detect CRCs and/or checkpoints inserted into the metaframe (at 226) and decode the metaframe (at 228) to extract the data 212 within the metaframe. For instance, upon receiving CP 306A, the receiver 220 could use the CRC within the CP 306A to validate the metaframe data since the previous CRC 308 was received. As another example, upon receiving CP 306B, the receiver 220 could use the CRC within the CP 306B to validate the metaframe data since the CP 306A. Upon successfully validating the data, the receiver 220 could forward the portion of the metaframe, without waiting on the rest of the metaframe data to be received. On the other hand, if the CRC validation fails, the receiver 220 could perform FEC decoding for the metaframe. It should be noted that although FIG. 2 shows certain operations in a sequence, according to various aspects, the steps shown in FIG. 2 could be performed in parallel. For example, as will be described in more detail below, in some embodiments, the receiver 220 is configured to perform FEC decoding (222) and metaframe decoding (228) in parallel.

Figure 4:
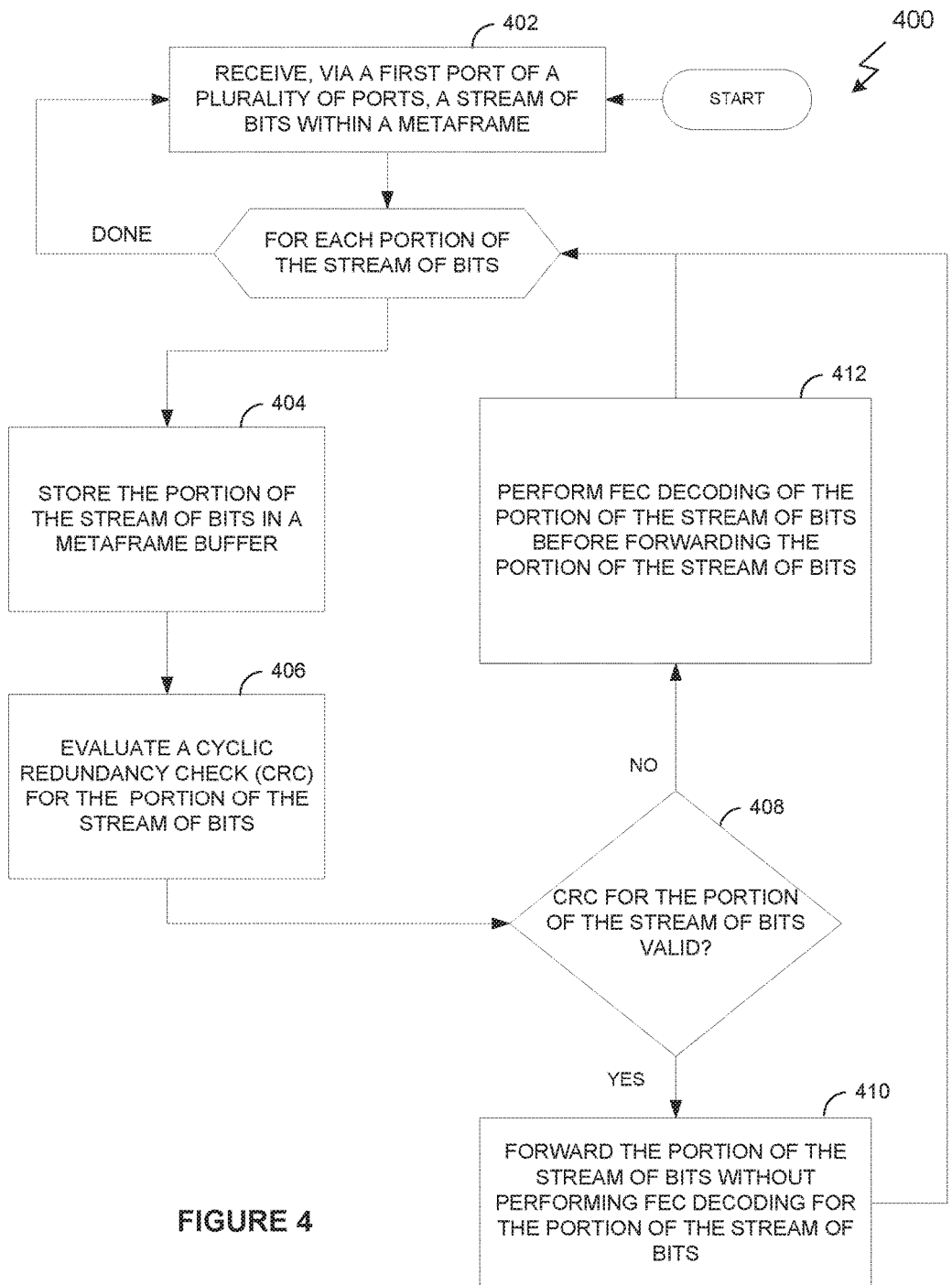
FIG. 4 is a flow diagram illustrating a method for minimizing latency and/or power consumption over a communication link, in accordance with embodiments of the present disclosure.

FIG. 4 is a flow diagram a method 400 for minimizing latency and/or power consumption over a communication link (e.g., upon receiving a stream of bits within a metaframe). The method 400 could be performed by any network device capable of communicating over a link. As shown, the method 400 begins at block 402, where a network device receives, via a first port of a plurality of ports, a stream of bits within a metaframe. For each portion of the stream of bits, the network device (at block 404) stores a portion of the stream of bits in a metaframe buffer. According to various embodiments, the size of the portion of the stream of bits depends, in part, on the size of the metaframe buffer. In one embodiment, the size of the metaframe buffer can be large enough to store the entire metaframe. In other embodiments, the size of the metaframe buffer can be large enough to store one or more segments of a metaframe.

At block 406, the network device evaluates a CRC for the portion of the stream of bits in order to determine (at block 408) whether to forward (i.e., perform data-cut through) the portion of the stream of bits in the metaframe buffer. In one embodiment, the determination of whether to forward the portion of the stream of bits occurs upon detecting a checkpoint within the stream of bits. For example, as mentioned above, the checkpoint is used to separate the metaframe into multiple segments, where each segment includes different portions of the stream of bits and each checkpoint includes a CRC for validating each portion of the stream of bits within each segment. Thus, in this embodiment, the determination of whether to forward is based on the CRC within the checkpoint detected within the stream of bits. In another embodiment, the determination of whether to forward occurs upon detecting the CRC at the end of the metaframe. For example, as mentioned above, checkpoints are generally included when there is unused bandwidth on the link. Thus, in the event checkpoints are not included in the metaframe, the entire stream of bits of the metaframe (e.g., first portion) could be stored in the metaframe buffer before the network device determines to forward the stream of bits.

The network device is also configured (as part of method 400) to determine, based on the forwarding determination, whether to perform FEC decoding for the portion of the stream of bits. As shown in FIG. 4, for example, upon determining (at block 408) that the CRC for the portion of the stream of bits is valid, the network device (at block 410) forwards the portion of the stream of bits without performing FEC decoding for the portion of the stream of bits. On the other hand, upon determining (at block 408) that the CRC for the portion of the stream of bits is invalid, the network device (at block 410) performs FEC decoding of the portion of the stream of bits before forwarding the portion of the stream of bits. Doing so in this manner provides an on-demand FEC mechanism in which FEC processing is performed only when an error is detected. As will be further described in detail with respect to FIG. 5, in one embodiment, the on-demand FEC mechanism operates to turn on FEC processing for a segment of a metaframe upon detection of an error within the segment (e.g., if a CRC within a CP for the segment fails). In another embodiment, the on-demand FEC mechanism operates to disable FEC processing for a segment of a metaframe (e.g., if a CRC within a CP for the segment passes).

Advantageously, determining whether to forward different portions of a stream of bits within a metaframe upon detection of a checkpoint (as opposed to waiting for an entire stream of bits to be received before determining whether to forward) provides a data cut-through mechanism which significantly minimizes the latency incurred in the decoding process. Additionally, determining whether to perform FEC decoding on different portions of a stream of bits within a metaframe also minimizes latency experienced, for example, during FEC decoding.

For example, the use of checkpoints adaptively reduces the accumulation latency from the size of the metaframe to the size of the average object (e.g., segment, etc.) within the metaframe while maintaining low overhead (e.g., using a few excess percentage of bandwidth).

According to certain aspects, the techniques presented herein could also be used (e.g., by receiving network devices) to significantly reduce the power consumed during FEC decoding. That is, by selectively performing FEC decoding for the one or more segments of the metaframe only when there is an error in the respective segment, as determined based on an evaluation of the respective CRC for the segment, the techniques presented herein are capable of significantly reducing the amount of power consumed during FEC decoding (i.e., a computationally expensive operation).

Figure 5:
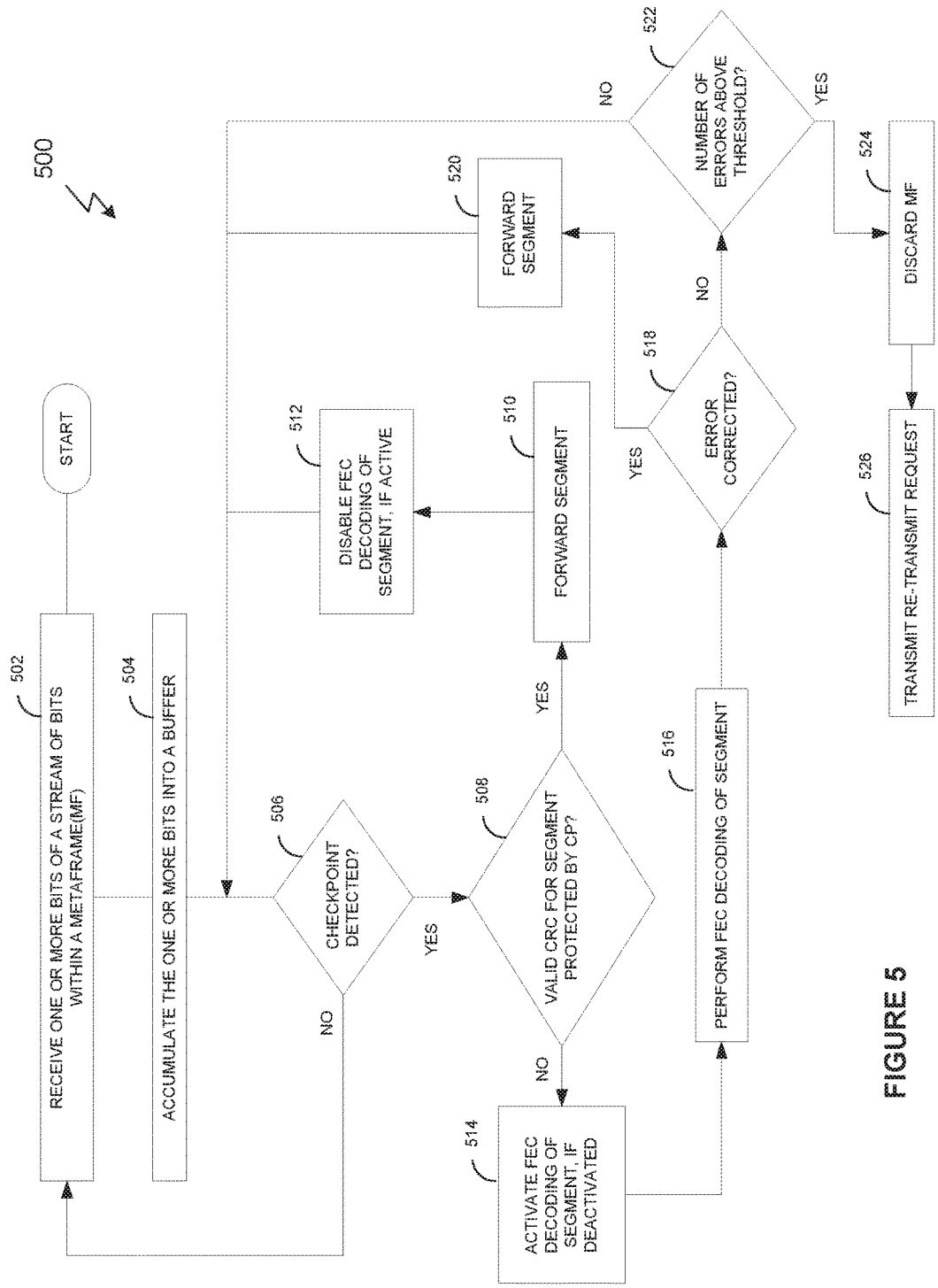
FIG. 5 is a flow diagram illustrating another method for minimizing latency and/or power consumption over a communication link, in accordance with embodiments of the present disclosure.

FIG. 5, for example, is a flow diagram of a method 500 for minimizing the latency incurred and/or power consumption for communications over a link. Similar to method 400, the method 500 could be performed by any network device capable of communicating over a link.

As shown, the method 500 includes, upon receiving (at block 502) one or more bits of a stream of bits within a metaframe, the network device starts to accumulate (at block 504) the one or more bits into a buffer. In one embodiment, the network device has its FEC decoder in a deactivated state when it starts to receive the one or more bits within the metaframe. In another embodiment, the network device has its FEC decoder in an active state when it starts to receive the one or more bits and may perform FEC decoding of the one or more bits in parallel with decoding of the metaframe (e.g., with determining whether to forward the metaframe).

At block 506, the network device determines whether a checkpoint is detected within the one or more bits. If the network device does not detect a checkpoint, the network device continues to store bits that are received within the metaframe. On the other hand, if the network device does detect a checkpoint, the network device then determines (at block 508) whether the segment of data protected by the checkpoint is valid based on the CRC within the checkpoint. It should be noted that, although not shown, in the event no checkpoints are included within the metaframe, the network device would continue to store the one or more bits until detection of the CRC at the end of the metaframe. In this scenario, the network device would then determine whether the metaframe is valid based on this CRC.

If the network device determines (at block 508) that the CRC within the CP for the segment is valid, then the network device forwards (at block 510) the segment of data protected by the CP. In one embodiment, if the network device is performing FEC decoding in parallel with metaframe decoding, the network device disables (at block 512) FEC decoding of the segment of data that was forwarded. In another embodiment, if the network device is not performing FEC decoding (i.e., FEC decoding is deactivated), the network device continues to keep FEC deactivated.

If, on the other hand, the network device determines (at block 508) that the CRC within the CP for the segment is invalid, then the network device determines not to forward the segment and activates (at block 514) FEC decoding of the segment (e.g., if FEC decoding was deactivated). At block 516, the network device then performs FEC decoding of the segment to correct the error. In some cases, upon activating FEC decoding for the particular segment, the network device could determine to keep FEC decoding activated for subsequent segments. In other cases, upon activating FEC decoding for the particular segment, the network device could determine to keep FEC decoding deactivated for subsequent segments. Doing so in this manner provides the network device with flexibility in determining when to perform FEC decoding.

At block 518, the network device determines whether the error within the segment is corrected. If so, (at block 520) the network device forwards the segment. On the other hand, if the network device determines that the error within the segment is not corrected, the network device can determine (at block 522) whether a number of detected errors are above a threshold. For example, as will be described in more detail below with respect to FIG. 7, in some cases, techniques presented herein also provide a mechanism for re-transmitting a metaframe in case a metaframe is dropped due to errors (within one or more segments of a metaframe) being above a threshold. Thus, if the network device determines (at block 522) that the number of errors is not above a predefined threshold, the network device could continue with the decoding process to detect the next checkpoint. If, however, (at block 522) the network device determines that the number of errors is above a threshold, then the network device could (at block 524) discard the metaframe and transmit a re-transmit request (at block 526) to the transmitting network device.

According to aspects, by performing FEC decoding for each segment of data protected by a checkpoint only when necessary (e.g., when an error is detected), the techniques presented herein are capable of significantly minimizing the amount of power consumed during the decoding process. Such techniques also are capable of significantly minimizing latency and/or power consumption over a communication link without comprising maximum throughput or protection strength and without requiring a re-transmit mechanism.

Figure 6:
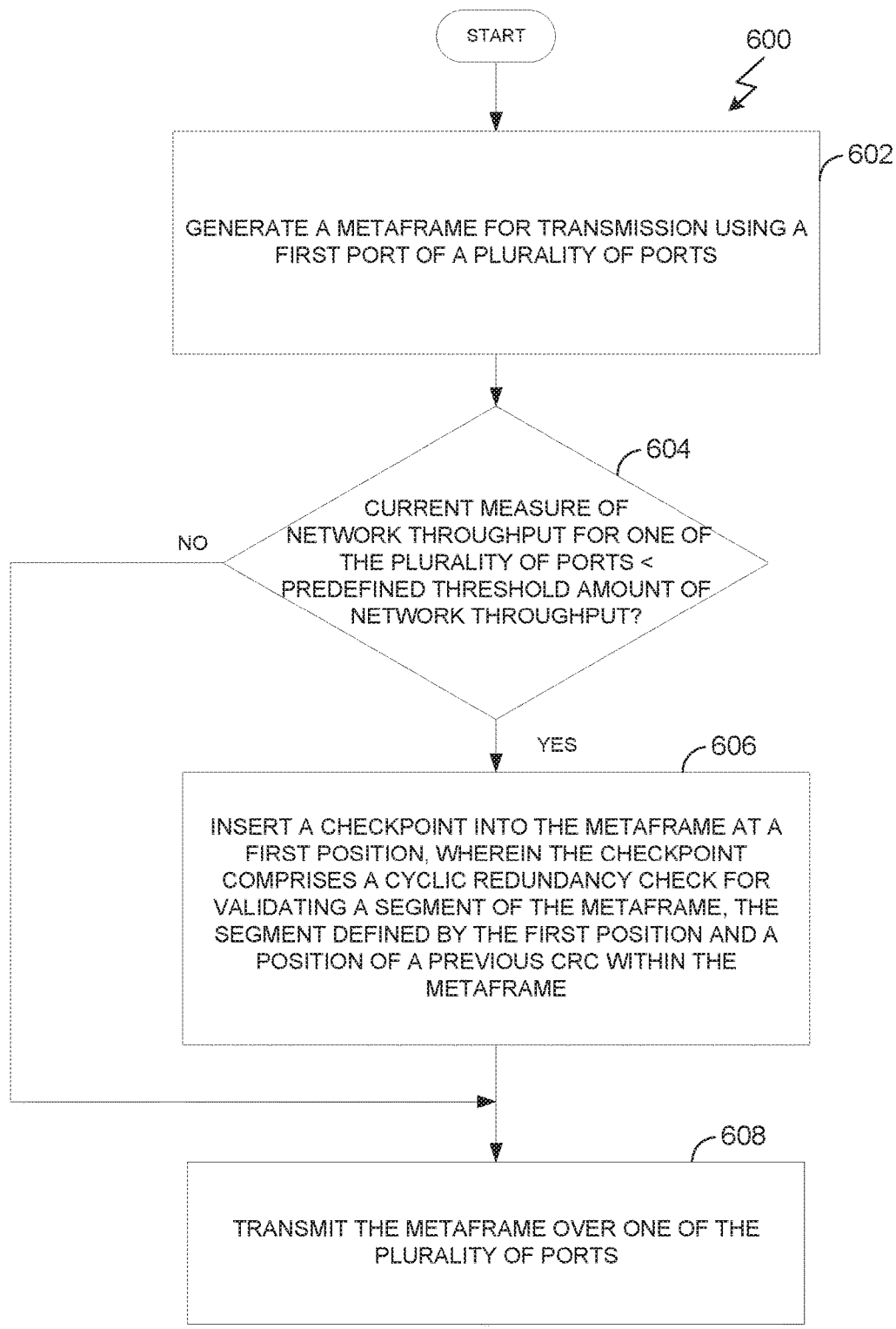
FIG. 6 is a flow diagram illustrating a method for transmitting a metaframe, in accordance with embodiments of the present disclosure.

FIG. 6 is a flow diagram of a method 600 for transmitting a metaframe, in accordance with embodiments of the present disclosure. The method 600 could be performed by any network device capable of communicating over a link. As shown, (at block 602) the network device generates a metaframe for transmission using a first port of a plurality of ports. As described above, the metaframe includes payload data having one or more bits. At block 604, the network device determines whether a current measure of network throughput for one of a plurality of ports is less than a predefined threshold amount of network throughput. If so, the network device (at block 606) then inserts one or more checkpoints in the metaframe to divide the metaframe into different segments, where each segment of the metaframe includes a portion of the data, and wherein each checkpoint includes a CRC for validating each segment of the metaframe. That is, the respective CRC included in each checkpoint can be used to validate the portion of data of the current metaframe since the last CRC (e.g., a CRC between metaframes, a CRC within a previous checkpoint, etc.). After inserting the checkpoints (or if the network device does not determine that a current measure of network throughput is less than the predefined threshold), the network device (at block 608) transmits the metaframe over one of the plurality of ports.

According to some embodiments, the network device also scrambles the one or more bits of the metaframe before transmitting the metaframe. Further, according to some embodiments, the network device encodes the one or more bits of the metaframe with a FEC code before transmitting the metaframe.

Figure 7:
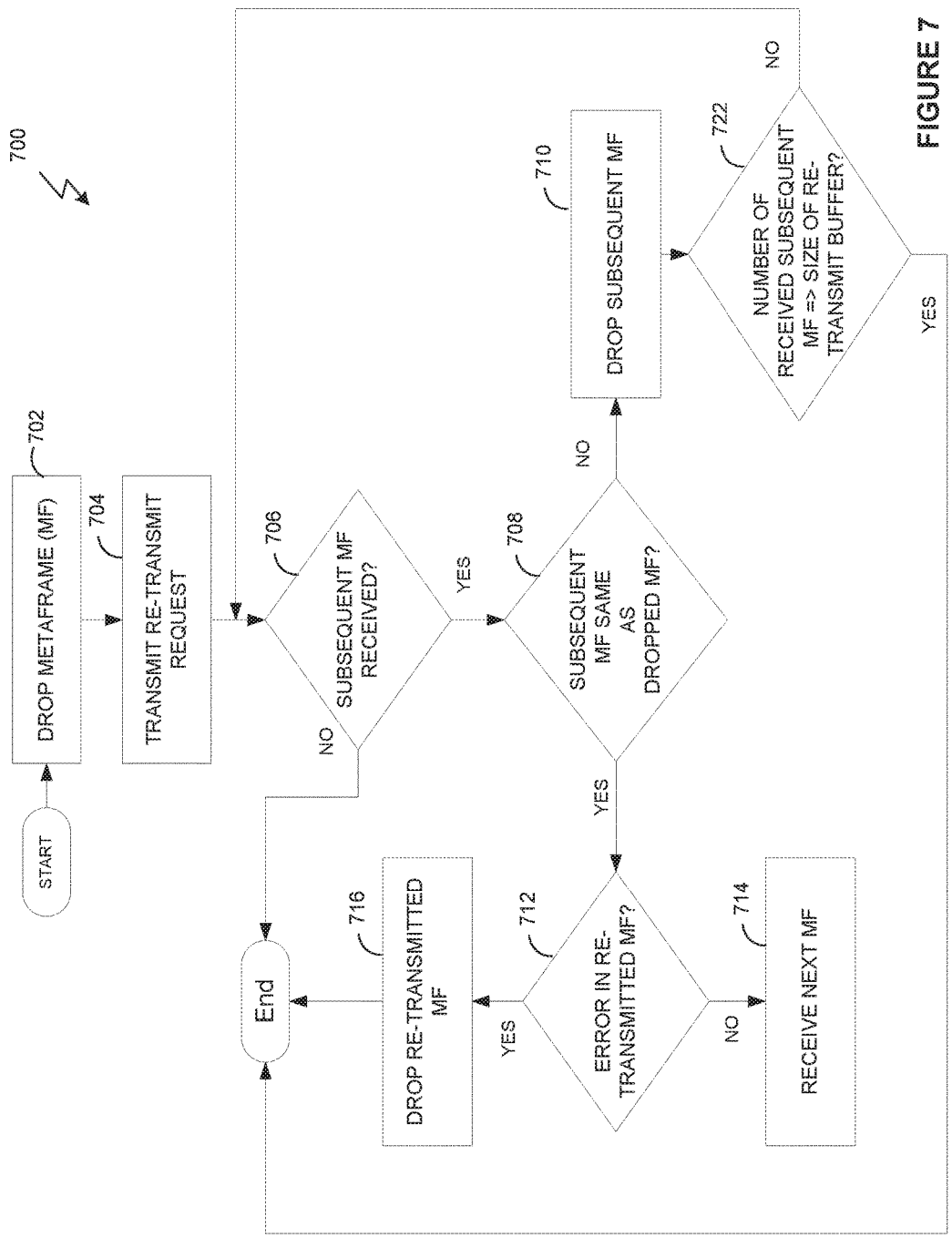
FIG. 7 is a flow diagram illustrating a method for transmitting a request for re-transmission of a metaframe, in accordance with embodiments of the present disclosure.

As mentioned above, the techniques presented herein also provide a mechanism for re-transmitting a metaframe (e.g., in circumstances when the network device determines that the CRC within one or more checkpoints is above a certain predefined threshold). FIG. 7, for example, is a flow diagram of a method 700 for transmitting a re-transmit request in the event a metaframe is dropped. The method 700 could be performed by a network device capable of communicating over a link.

As shown, the method 700 begins (at block 702) where the network device drops a metaframe. As mentioned above, in some embodiments, dropping a metaframe may occur upon a determination that a number of invalid CRCs within one or more checkpoints of a metaframe are above a predefined threshold. In other embodiments, dropping a metaframe may occur upon a determination that the CRC at the end of the metaframe is invalid. Upon dropping a metaframe, the network device (at block 704) transmits a request for re-transmission of the metaframe, and (at block 706) determines whether a subsequent metaframe has been received. If the network device determines (at block 706) that a subsequent metaframe has been received, the network device then determines (at block 708) whether the subsequent metaframe is the same as the dropped metaframe. On the other hand, if the network device determines (at block 706) that a subsequent MF has not been received, the network device determines the re-transmission mechanism has failed. According to various embodiments, a subsequent metaframe may not be received due to delay, an error in the request for re-transmission of a metaframe, an error in the re-transmitted metaframe, link failure, etc.

In general, in cases where round trip time (RTT) is less than the metaframe transmission time, the network device may receive a re-transmission of multiple metaframes. In some situations, the network device could expect to receive two to three subsequent transmissions of metaframes after transmitting the request for re-transmission of the dropped metaframe. In other cases, with checkpoint support, the re-transmit length could drop to one metaframe, and thus the network device could expect to receive one subsequent transmission of the dropped metaframe.

If the network device determines (at block 708) that the subsequent received metaframe is not the same as the dropped metaframe, the network device (at block 710) drops the subsequent received metaframe. According to various embodiments, the number of subsequent metaframes that can be received by the network device is, in general, based on the size of a re-transmit buffer of a transmitting network device. The size of the re-transmit buffer generally depends on the type of link used for communication. For example, in some embodiments, the re-transmit buffer could be large enough to hold eight metaframes. In other embodiments, the re-transmit buffer could be large enough to hold three metaframes.

Thus (at block 722), if the number of received subsequent metaframes is equal or greater than a size of a re-transmit buffer (e.g., of a transmitting network device), the network device may determine that the re-transmission mechanism has failed. If (at block 722) the number of received subsequent metaframes is less than a size of a re-transmit buffer, the network device continues to wait for a subsequent metaframe (at block 706).

Referring back to block 708, if the network device determines that the subsequent received metaframe is the same as the dropped metaframe, the network device then determines (at block 712) whether there is an error in the re-transmitted metaframe (e.g., using any of the techniques described above). If the network device determines that there is no error, the network device then waits (at block 714) to receive the next metaframe. If, on the other hand, the network device determines that there is an error in the re-transmitted metaframe, the network device drops (discards) (at block 716) the re-transmitted metaframe and determines that the re-transmission mechanism has failed. The network device, in general, may drop the re-transmitted metaframe at block 716 (e.g., instead of transmitting another request for re-transmission), in part, because the metaframe number of the sequence of metaframes is unknown or too many metaframes have been lost. On the other hand, another request for re-transmission could happen, for example, in situations where the network device receives a successful re-transmission of a failed metaframe, but determines that a subsequent received metaframe (e.g., after the successful re-transmission) has failed.

In some cases, a livelock could occur if both directions (e.g., transmitting network device and receiving network device) make a request for re-transmission and the requested metaframes contain the re-transmission requests. Generally, a livelock represents a situation in which two or more devices (e.g., the transmitting network device and the receiving network device) continually alter their state in response to changes in the other device's state, resulting in an indefinite state-change loop. In these situations, the livelock could be broken by the receiving network device ignoring a re-transmission request if it is in the re-transmitted metaframe.

Figure 8:
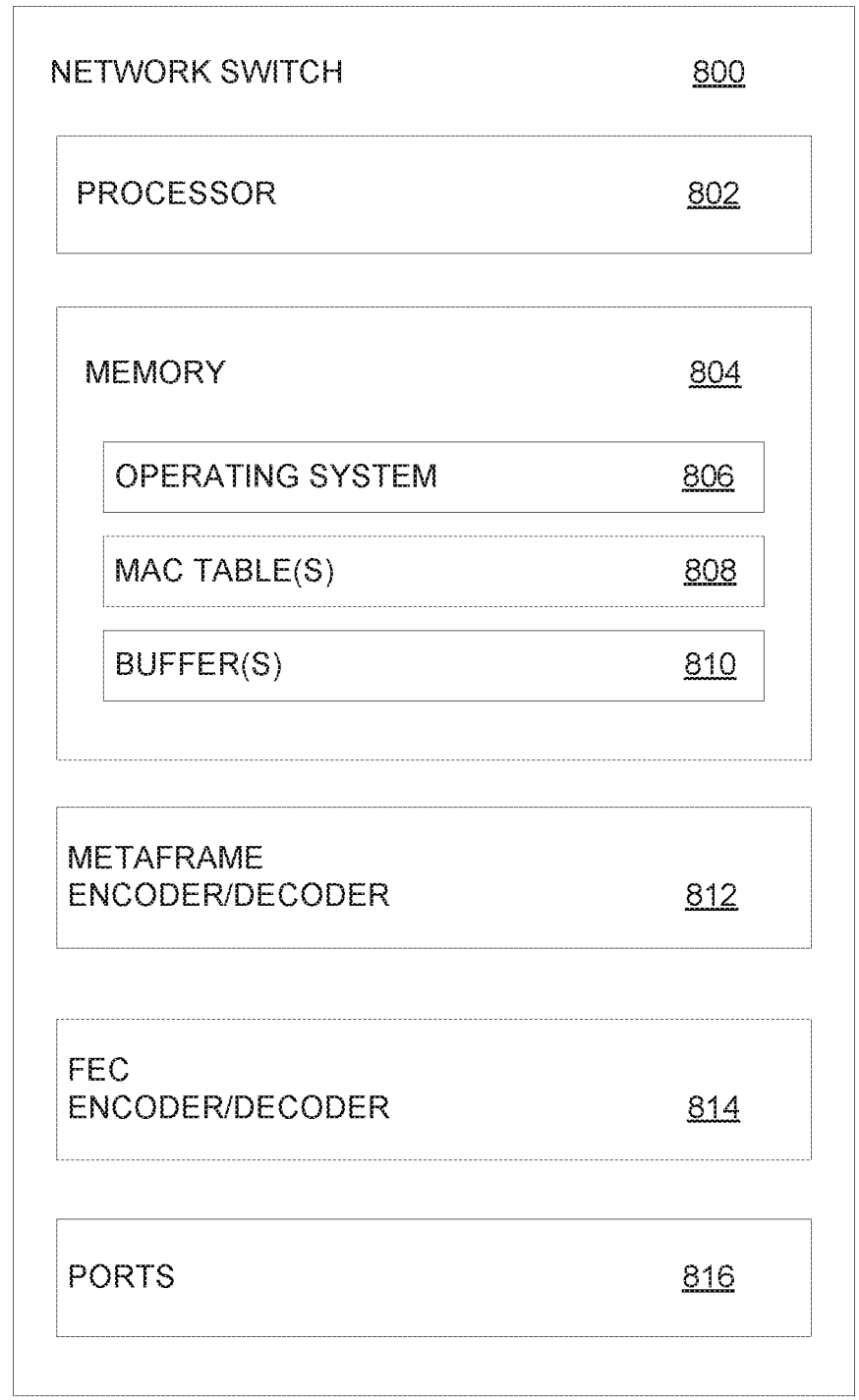
FIG. 8 is a block diagram illustrating a network switch configured with a metaframe encoder/decoder and a FEC encoder/decoder, in accordance with embodiments of the present disclosure.

FIG. 8 is a block diagram illustrating a network switch, according to one embodiment described herein. The network switch 800 includes a processor 802, a memory 804, Metaframe encoder/decoder 812, FEC encoder/decoder 814 and a plurality of ports 816. The processor 802 may be any processing element capable of performing the functions described herein, and such a processor can represent a single processor, multiple processors, a processor with multiple cores, and combinations thereof. Of course, the depicted example is for illustrative purposes only, and it is contemplated that certain embodiments may be implemented without such processors.

The memory 804 may be either volatile or non-volatile memory and include, RAM, flash, cache, disk drives and the like. Although shown as a single entity, the memory 804 may be divided into different memory storage elements such as RAM and one or more hard disk drives. In one embodiment, the memory 804 comprises one or more static random access memory (SRAM) modules. As shown, the memory 804 includes an operating system 806, MAC table(s) 808 and buffer(s) 810. The operating system 806 generally controls the execution of application programs on the network switch 800. Examples of operating system 806 include, without limitation, versions of Cisco® IOS®, Cisco® Catalyst OS, UNIX and distributions of the Linux® operating system.

Generally, the MAC table(s) 808 represents a data structure that maps MAC addresses to ports in the plurality of ports 814. In one embodiment, the MAC table(s) 808 is stored in a ternary content addressable memory (TCAM).

The buffers 810 generally represent temporary storage entities that may be used in conjunction with storing one or more bits of data that is transmitted (e.g., in the case re-transmit is enabled) and/or received for processing by Metaframe decoder 812, FEC decoder 814, etc. (e.g., for processing of received data).

The Metaframe encoder/decoder 812 and the FEC encoder/decoder 814 are generally configured to minimize latency and/or power consumption when communicating over a link through one of the plurality of ports 816. When the network switch 800 is transmitting, the Metaframe encoder/decoder 812 is generally configured to format a stream of bits into one or more fixed blocks of data (e.g., such as a metaframe) and perform processing (e.g., such as insertion of checkpoints/CRCs, scrambling, re-transmission, etc.) of the stream of bits. In addition, when the network switch 800 is transmitting, the FEC encoder/decoder 814 is generally configured to encode the stream of bits with a FEC code to be used for correcting any errors within the stream of bits.

When the network switch is receiving, the Metaframe encoder/decoder 812 is generally configured to perform processing (e.g., de-scrambling, detecting checkpoints/CRCs, data-cut through, etc.) on the stream of bits. In addition, when the network switch is receiving, the FEC encoder/decoder 812 is generally configured to perform FEC decoding (on-demand) of the stream of bits in order to correct any errors within the stream of bits.

Although shown as separate entities, those of ordinary skill in the art will understand that the functions of the Metaframe encoder/decoder 812 and the functions of the FEC encoder/decoder 814 could be performed by a single module. In addition, in some embodiments, the FEC encoder/decoder 814 and the Metaframe encoder/decoder 812 are configured to operate in parallel.

Figure 9:
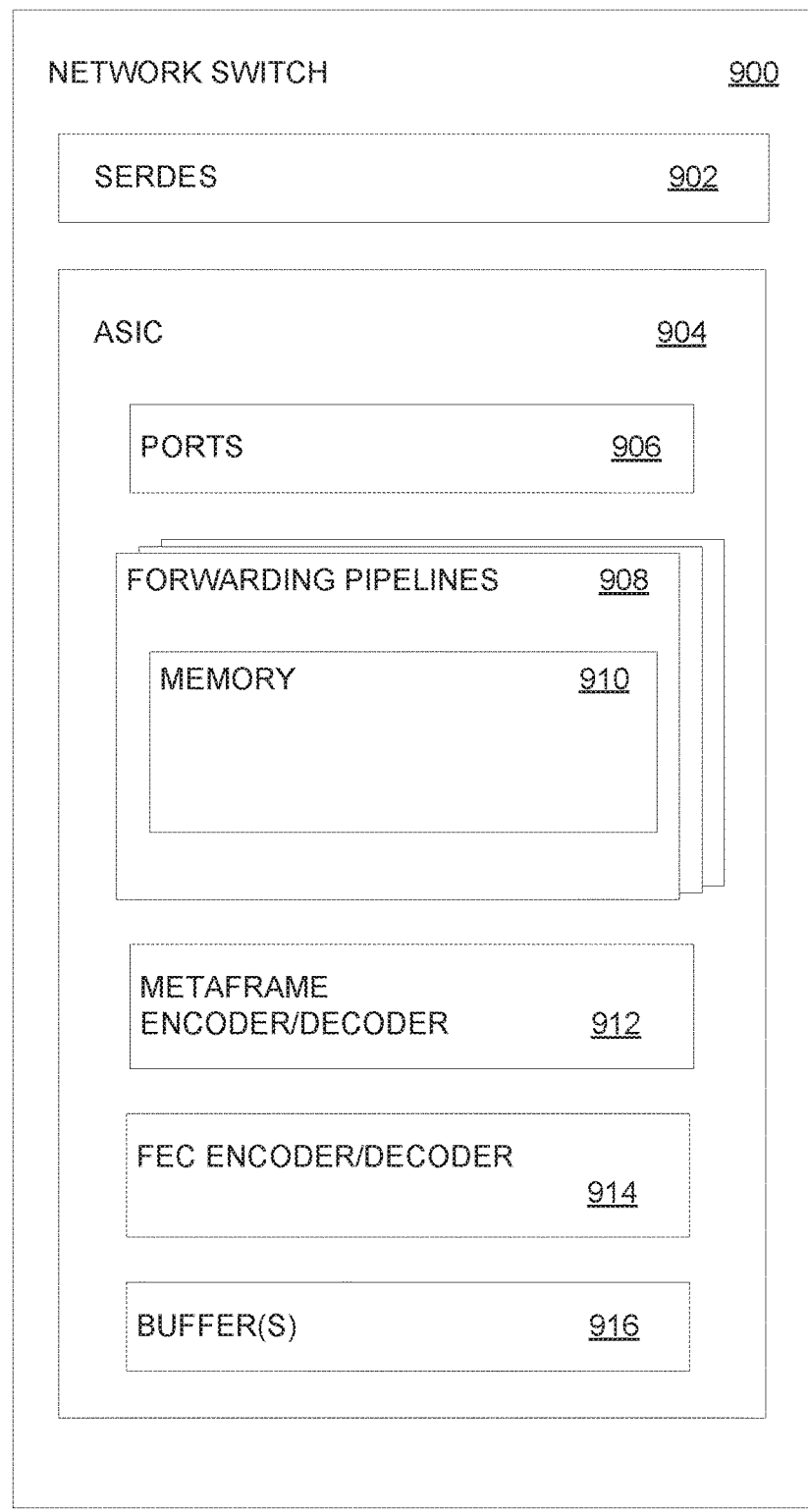
FIG. 9 is a block diagram illustrating another network switch configured with a Metaframe encoder/decoder and a FEC encoder/decoder, in accordance with embodiments of the present disclosure.

FIG. 9 is a block diagram illustrating another network switch, according to one embodiment described herein. The network switch 700 includes a SerDes 902, an ASIC 904, and the ASIC 904 includes a plurality of ports 906, a plurality of forwarding pipelines 908, Metaframe encoder/decoder 912, FEC encoder/decoder 914, and buffer(s) 916. In one embodiment, the network switch 900 further contains one or more processors (not shown). The processor(s) may be any processing element capable of performing the functions described herein, and such a processor can represents single processor, multiple processors, a processor with multiple cores, and combinations thereof. Of course, the depicted example is for illustrative purposes only, and it is contemplated that certain embodiments may be implemented without such processors.

Each of the forwarding pipelines 908 includes a memory 910. The memory 910 may be either volatile or non-volatile memory and include, RAM, flash, cache, disk drives and the like. Although shown as a single entity, the memory 910 may be divided into different memory storage elements such as RAM and one or more hard disk drives. In one embodiment, the memory 910 comprises one or more static random access memory (SRAM) modules.

As discussed above, the Metaframe encoder/decoder 912 and the FEC encoder/decoder 914 are generally configured to minimize latency and/or power consumption for data communications over a link, such as over the SerDes 902. The SerDes 902 may be used to serialize/deserialize data that is transmitted and received via the plurality of ports. Moreover, the buffers 916 may be used to temporarily store data before/after it is utilized by the SerDes 902.

The techniques presented herein (e.g., checkpoints, data cut-through, on-demand FEC, etc.) allow portions of data in a frame to be forwarded (e.g., to the rest of a receiving device) without waiting for the remainder of the frame or for FEC calculation. As such, the techniques presented herein provide a dynamic tradeoff between latency and throughput.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. For example, a portion of the resources may include intermediate devices, such as routers, switches, etc., that are located in the cloud and these intermediate devices may communicate utilizing any of the techniques presented herein. For example, a number of the switches could perform data-cut through based on checkpoints inserted into one or more metaframes and/or on-demand FEC for any of the communications passing through the cloud. Doing so may reduce the latency and/or power consumed by the resources in the cloud.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method of reducing latency associated with metaframe error correction, the computer-implemented method comprising:
    receiving, via a first port of a plurality of ports, a stream of bits within a metaframe, the metaframe divided into a plurality of segments, each segment comprising fewer bits than the metaframe;
    identifying a first segment, of the plurality of segments, based on the stream of bits:
    identifying a first cyclic redundancy check (CRC) for the first segment, based on the stream of bits;
    evaluating the first segment and determining that the first CRC is valid, and in response transmitting the first segment without performing forward error correction (FEC) decoding for the first segment; and
    evaluating a second CRC for a second segment, of the plurality of segments, and determining that the second CRC is invalid, and in response performing FEC decoding for the metaframe, including the second segment, before forwarding the second segment.

2. The method of claim 1, wherein identifying the first segment is based on detecting a checkpoint within the stream of bits, wherein the checkpoint is one of a plurality of checkpoints used to separate the metaframe into the plurality of segments, wherein each checkpoint comprises a CRC for validating each segment, wherein the first segment is stored in a metaframe buffer, wherein the first segment in the metaframe buffer corresponds to one segment of the plurality of segments.

3. The method of claim 1, wherein:
upon receiving the stream of bits, FEC decoding for the stream of bits is activated such that FEC decoding for a first portion of the stream of bits operates in parallel with evaluating the CRC for the first portion of the stream of bits.

4. The method of claim 1, wherein:
upon receiving the stream of bits, FEC decoding for the stream of bits is inactive; and
performing the FEC decoding upon the determination that the CRC for the second segment is invalid comprises:
activating the FEC decoding for the second segment; and
continuing to keep FEC decoding for a third segment, of the plurality of segments, inactive.

5. A network device to reduce latency associated with metaframe error correction, the network device comprising:
a plurality of ports; and
logic configured to:
receive, via a first port of the plurality of ports, a stream of bits within a metaframe, the metaframe divided into a plurality of segments, each segment comprising fewer bits than the metaframe;
identify a first segment, of the plurality of segments, based on the stream of bits:
identify a first cyclic redundancy check (CRC) for the first segment, based on the stream of bits;
evaluate the first segment and determining that the first CRC is valid, and in response transmit the first segment without performing forward error correction (FEC) decoding for the first segment; and
evaluate a second CRC for a second segment, of the plurality of segments, and determine that the second CRC is invalid, and in response perform FEC decoding for the metaframe, including the second segment, before forwarding the second segment.

6. The network device of claim 5, wherein the network device is configured not to perform FEC decoding when the stream of bits is received.

7. The network device of claim 5, wherein the network device is configured to perform FEC decoding when the stream of bits is received.

8. The network device of claim 5, wherein the logic is further configured to upon determining that a number of invalid CRCs for the plurality of segments of the metaframe is above a predefined threshold:
discard the metaframe;
transmit, via a second port of the plurality of ports, a request for re-transmission of the metaframe; and
receive the re-transmission of the metaframe.

9. A non-transitory computer readable medium containing computer program code that, when executed by operation of one or more processors, performs an operation, the operation comprising:
receiving, via a first port of a plurality of ports, a stream of bits within a metaframe, the metaframe divided into a plurality of segments, each segment comprising fewer bits than the metaframe;
identifying a first segment, of the plurality of segments, based on the stream of bits:
identifying a first cyclic redundancy check (CRC) for the first segment, based on the stream of bits;
evaluating the first segment and determining that the first CRC is valid, and in response transmitting the first segment without performing forward error correction (FEC) decoding for the first segment; and
evaluating a second CRC for a second segment, of the plurality of segments, and determining that the second CRC is invalid, and in response performing FEC decoding for the metaframe, including the second segment, before forwarding the second segment.

10. The non-transitory computer readable medium of claim 9, wherein identifying the first segment is based on detecting a checkpoint within the stream of bits, wherein the checkpoint is one of a plurality of checkpoints used to separate the metaframe into the plurality of segments, wherein each checkpoint comprises a CRC for validating each segment, wherein the first segment is stored in a metaframe buffer, wherein the first segment in the metaframe buffer corresponds to one segment of the plurality of segments.

11. The non-transitory computer readable medium of claim 9, wherein:
upon receiving the stream of bits, FEC decoding for the stream of bits is activated such that FEC decoding for a first portion of the stream of bits operates in parallel with evaluating the CRC for the first portion of the stream of bits.

12. The non-transitory computer readable of claim 9, wherein:
upon receiving the stream of bits, FEC decoding for the stream of bits is inactive; and
performing the FEC decoding upon the determination that the CRC for the second segment is invalid comprises:
activating the FEC decoding for the second segment; and
continuing to keep FEC decoding for a third segment, of the plurality of segments, inactive.

13. The network device of claim 5, wherein identifying the first segment is based on detecting a checkpoint within the stream of bits, wherein the checkpoint is one of a plurality of checkpoints used to separate the metaframe into the plurality of segments, wherein each checkpoint comprises a CRC for validating each segment, wherein the first segment is stored in a metaframe buffer, and wherein the first segment in the metaframe buffer corresponds to one segment of the plurality of segments.

14. The network device of claim 5, wherein:
upon receiving the stream of bits, FEC decoding for the stream of bits is inactive; and
performing the FEC decoding upon the determination that the CRC for the second segment is invalid comprises:
activating the FEC decoding for the second segment; and
continuing to keep FEC decoding for a third segment, of the plurality of segments, inactive.

* * * * *

UNITED STATES PATENT AND TRADEMARK OFFICE
CERTIFICATE OF CORRECTION

PATENT NO. : 10,469,200 B2  
APPLICATION NO. : 15/888905  
DATED : November 5, 2019  
INVENTOR(S) : Paul Lachlan Mantiply et al.

Page 1 of 1

It is certified that error appears in the above-identified patent and that said Letters Patent is hereby corrected as shown below:

In the Drawings

On sheet 2 of 10, in Figure 100C, (top left), Line 3, delete "Linecard" and insert -- Line card --, therefor.

In the Specification

In Column 7, Lines 43-44, delete "Soloman" and insert -- Solomon --, therefor.

In the Claims

In Column 16, Line 50, in Claim 1, delete "bits:" and insert -- bits; --, therefor.

In Column 17, Line 27, in Claim 5, delete "bits:" and insert -- bits; --, therefor.

In Column 18, Line 2, in Claim 9, delete "bits:" and insert -- bits; --, therefor.

In Column 18, Line 32, in Claim 12, after "readable" insert -- medium --.

Signed and Sealed this  
Eleventh Day of February, 2020

Andrei Iancu  
*Director of the United States Patent and Trademark Office*